(12) United States Patent
Lin

(10) Patent No.: US 6,739,875 B1
(45) Date of Patent: May 25, 2004

(54) TEACH-AIDING WEIGHT SET

(75) Inventor: Fu-Chi Lin, Taipei Hsien (TW)

(73) Assignee: Youth Toy Enterprise Co., Ltd, Taipei Hsien (TW)

( * ) Notice: Subject to any disclaimer, the term of this patent is extended or adjusted under 35 U.S.C. 154(b) by 0 days.

(21) Appl. No.: 10/455,401

(22) Filed: Jun. 6, 2003

(51) Int. Cl.⁷ .............................. G09B 1/00; G09B 19/02
(52) U.S. Cl. ...................... 434/195; 434/188; 434/191; 434/194
(58) Field of Search ................................ 434/188, 191, 434/193, 194, 195, 196, 200, 207

(56) References Cited

U.S. PATENT DOCUMENTS

| | | | | |
|---|---|---|---|---|
| 3,204,343 A | * | 9/1965 | Pollock | 434/195 |
| 3,486,244 A | * | 12/1969 | Horn | 34/398 |
| 3,613,268 A | * | 10/1971 | Fowler | 434/194 |
| 4,240,213 A | * | 12/1980 | Lutin | 434/194 |
| 4,382,794 A | * | 5/1983 | Preus | 434/193 |
| 4,731,022 A | * | 3/1988 | Garland | 434/194 |
| 4,871,314 A | * | 10/1989 | Shih | 434/194 |
| 6,575,754 B2 | * | 6/2003 | Salvo | 434/195 |

* cited by examiner

Primary Examiner—Kurt Fernstrom

(57) ABSTRACT

A teach-aiding weight set includes a white, a red, a light green, a purple, a yellow, a green, a black, a brown, a blue, and an orange weight. Each of the weights is provided with spaced shallow grooves to show a plurality of equal sections corresponding to a specific weight thereof. The specific color, weight, and shallow-groove-divided sections of each of the weights help small children to learn primary mathematical concepts, particularly the concept of weight.

1 Claim, 4 Drawing Sheets

US 6,739,875 B1

TEACH-AIDING WEIGHT SET

FIELD OF THE INVENTION

The present invention relates to a teach-aiding weight set, and more particularly to a teach-aiding weight set that includes ten pieces of differently colored and weighed weights, each of which is provided with shallow grooves to divide into a plurality of equal sections, and is therefore useful in helping small children to learn basic mathematic concepts through touching and playing these weights.

BACKGROUND OF THE INVENTION

Mathematics includes very strict structure and is highly abstract. In teaching small children basic mathematic concepts, it is preferable to employ some natural ways acceptable by children. For example, it is a good way to teach small children to count by guiding them to count the cookies they are eating, or by distinguishing different colors of cookies. In other words, it is important to help small children to learn the meaning of numbers from their daily life instead of teaching them to recognize symbols representing numbers. In this manner, there would be more learning space for small children to know about numbers and culture their interesting in numbers. On the other hand, the room for developing mathematics would be largely reduced if the small children were only taught to learn some numeral symbols.

It is a very important part in developing small children's intelligence to train them about their ability in mathematics. The mathematics involves in number, amount, shape, and calculation. By using some concrete and physical pictures that meet small children's ages and mental characteristics, it is possible to help small children to learn about amount. Since the amount of heaviness, or the weight, is also a highly abstract concept in the field of mathematics, it could not be taught or represented simply by language. A most concrete and effective way for small children to learn about weight is to allow them to touch and play. Through an integration effect of their perception system, the small children are able to associate their real experiences with the abstract concept of weight.

It is therefore tried by the inventor to develop a teach-aiding weight set that includes a set of differently colored and weighed weights suitable for touching and playing by small children in the process of learning the concept of weight.

SUMMARY OF THE INVENTION

A primary object of the present invention is to provide a teach-aiding weight set that includes ten pieces of differently colored and weighed weights, each of which is provided with spaced shallow grooves and therefore divided into a plurality of equal sections, so that small children are guided to build a basic mathematic concept through touching and playing these weights.

To achieve the above and other objects, the teach-aiding weight set of the present invention mainly includes a white, a red, a light green, a purple, a yellow, a green, a black, a brown, a blue, and an orange weight. Each differently colored weight is specifically weighed. And, spaced shallow grooves are provided on outer surfaces of the weights to equally divide each weight into different number of sections corresponding to the heaviness thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
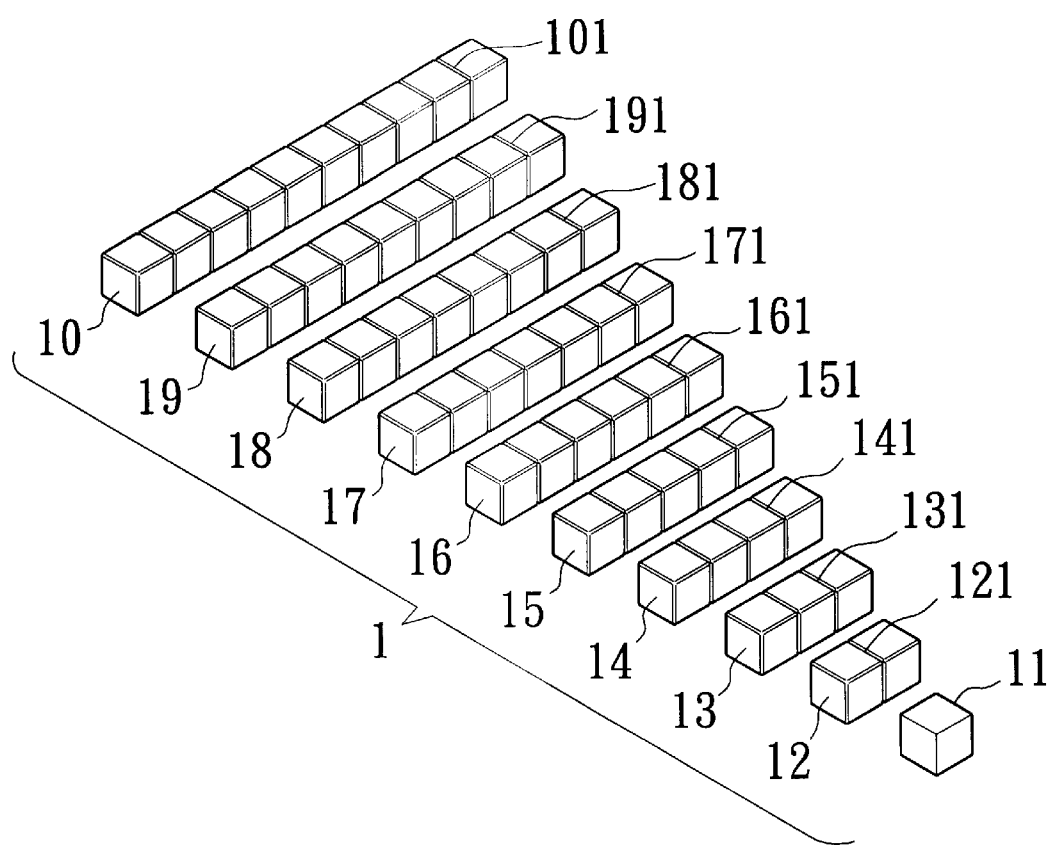
FIG. 1 is a perspective view of a complete teach-aiding weight set of the present invention.

Please refer to FIG. 1 that is a perspective view of a complete teach-aiding weight set 1 according to the present invention. As shown, the teach-aiding weight set 1 includes ten pieces of weights, including:

a white weight 11 in the form of a cube and weighed 1 gram;

a red weight 12 in the form of a rectangular parallelepiped, weighed 2 grams, and provided on four longitudinal outer surfaces with a continuously extended shallow groove 121 to divide the red weight 12 into two equal sections;

a light green weight 13 in the form of a rectangular parallelepiped, weighed 3 grams, and provided on four longitudinal outer surfaces with two continuously extended and equally spaced shallow grooves 131 to divide the light green weight 13 into three equal sections;

a purple weight 14 in the form of a rectangular parallelepiped, weighed 4 grams, and provided on four longitudinal outer surfaces with three continuously extended and equally spaced shallow grooves 141 to divide the purple weight 14 into four equal sections;

a yellow weight 15 in the form of a rectangular parallelepiped, weighed 5 grams, and provided on four longitudinal outer surfaces with four continuously extended and equally spaced shallow grooves 151 to divide the yellow weight 15 into five equal sections;

a green weight 16 in the form of a rectangular parallelepiped, weighed 6 grams, and provided on four longitudinal outer surfaces with five continuously extended and equally spaced shallow grooves 161 to divide the green weight 16 into six equal sections;

a black weight 17 in the form of a rectangular parallelepiped, weighed 7 grams, and provided on four longitudinal outer surfaces with six continuously extended and equally spaced shallow grooves 171 to divide the black weight 17 into seven equal sections;

a brown weight 18 in the form of a rectangular parallelepiped, weighed 8 grams, and provided on four longitudinal outer surfaces with seven continuously extended and equally spaced shallow grooves 181 to divide the brown weight 18 into eight equal sections;

a blue weight 19 in the form of a rectangular parallelepiped, weighed 9 grams, and provided on four longitudinal outer surfaces with eight continuously extended and equally spaced shallow grooves 191 to divide the blue weight 19 into nine equal sections; and an orange weight 10 in the form of a rectangular parallelepiped, weighed 10 grams, and provided on four longitudinal outer surfaces with nine continuously extended and equally spaced shallow grooves 101 to divide the orange weight 10 into ten equal sections.

When small children are guided to touch and play the above-described ten pieces of differently colored, weighed, and divided weights, they may visually distinguish different amounts of heaviness identified by different colors or numbers of sections, and thereby learn the mathematical concept of weight from touching and playing the weights.

Figure 2:
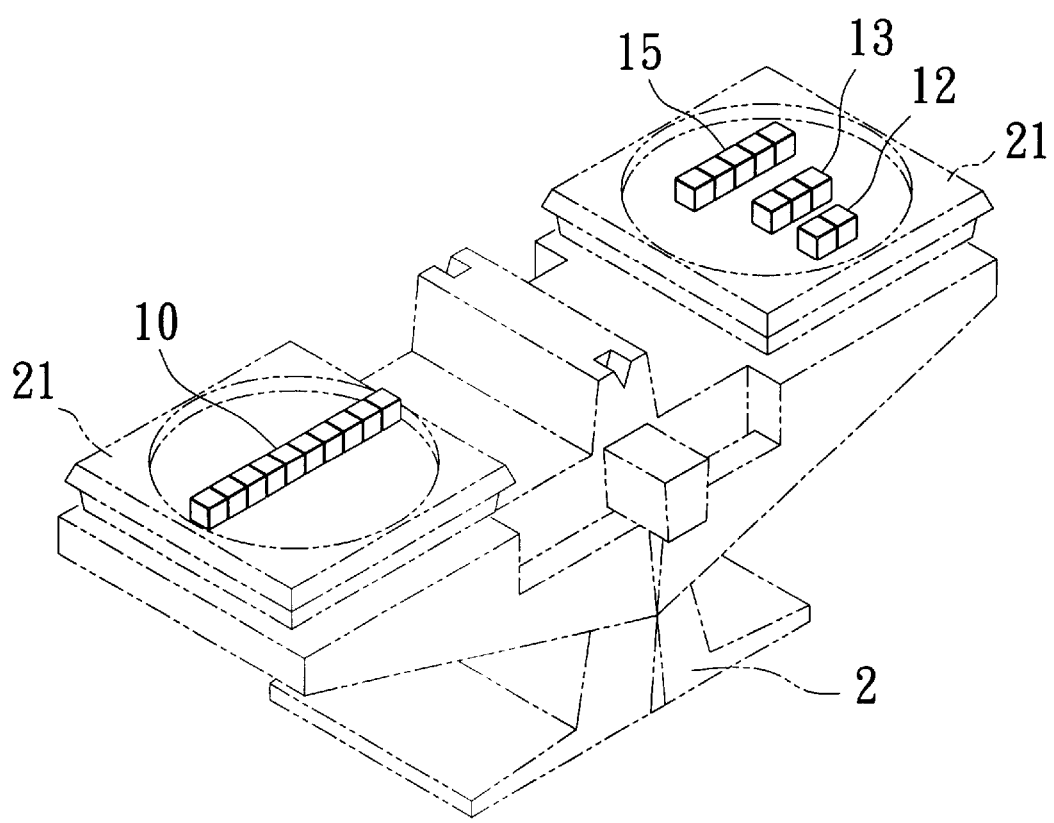
FIG. 2 shows a first example of using the teach-aiding weight set of the present invention to teach the concept of weight.

FIG. 2 shows a first example of using the teach-aiding weight set 1 of the present invention to teach the concept of weight. As shown, one 10-gram orange weight 10 is positioned in a left scale plate 21 of a balance 2, and one 5-gram yellow weight 15 and one 3-gram light green weight 13 and one 2-gram red weight 12 are positioned in a right scale plate 21. The balance 2 is in a balanced state because both the left and the right scale plate 21 have total 10 grams of weight thereon. This helps the small children to understand the balanced state is reached because the balance 2 has equal weight at two sides thereof. The balance 2 would lose its balance when one or more weights are added to or removed from any of the two scale plates 21 of the balance 2. And when the balance 2 loses its balance, one of the scale plates 21 having heavier weight would descend while the other scale plate 21 ascends. The small children could then have a primary idea about heaviness and lightness through handling the weights 10 to 19.

Figure 3:
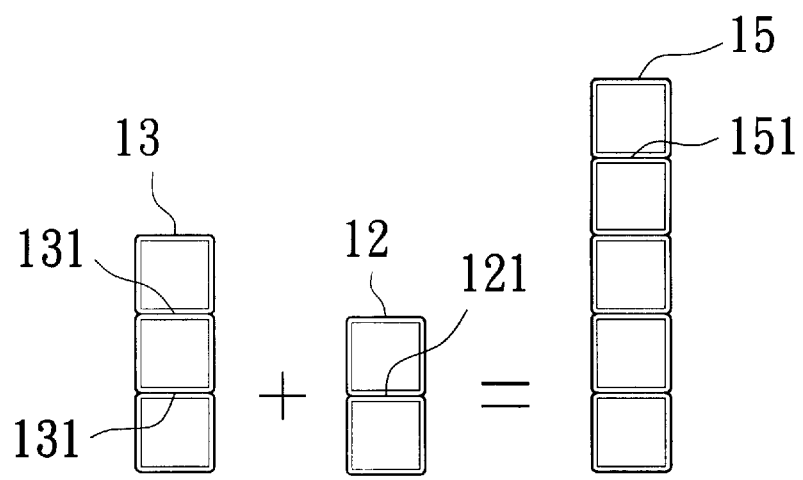
FIG. 3 shows a second example of using the teach-aiding weight set of the present invention to teach addition.
Figure 4:
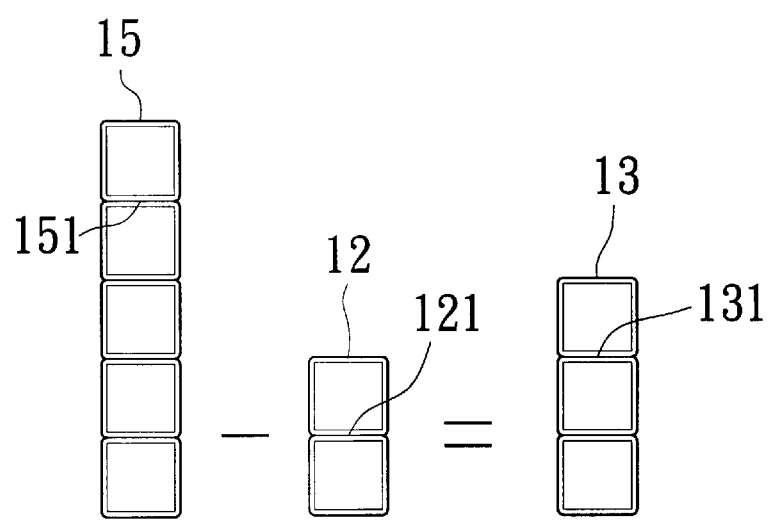
FIG. 4 shows a third example of using the teach-aiding weight set of the present invention to teach subtraction.
Figure 5:
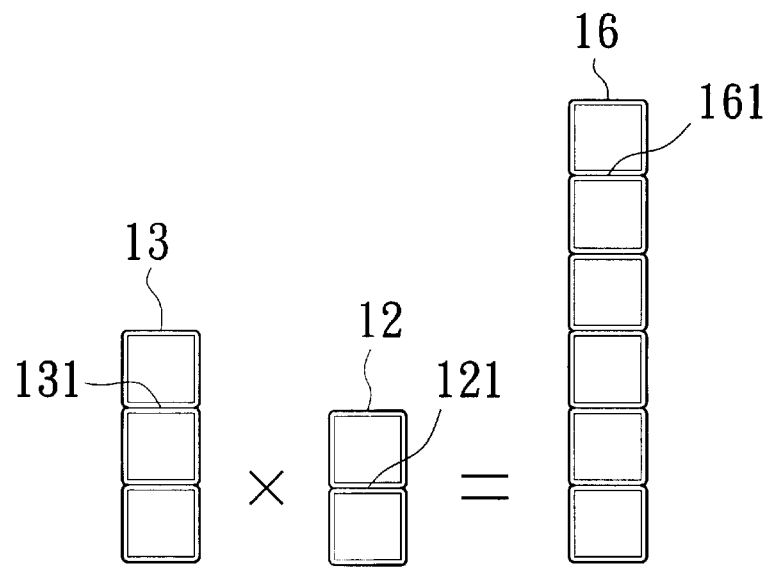
FIG. 5 shows a fourth example of using the teach-aiding weight set of the present invention to teach multiplication.
Figure 6:
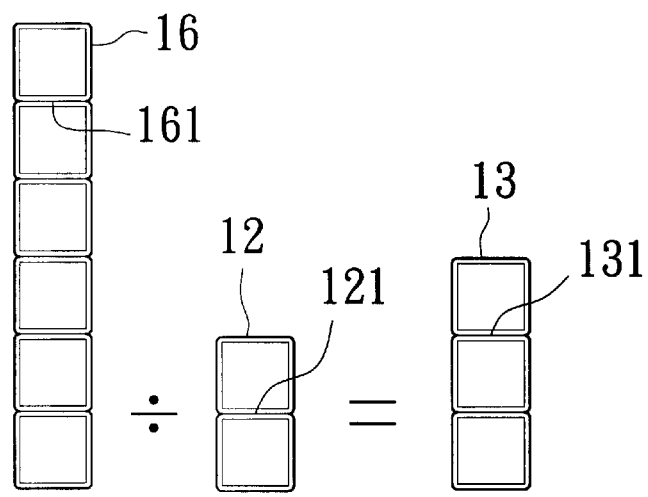
FIG. 6 shows a fifth example of using the teach-aiding weight set of the present invention to teach division.

FIGS. 3 to 6 illustrates examples of using the teach-aiding weight set 1 of the present invention in teaching mathematical operations, including addition, subtraction, multiplication, and division. As shown in FIG. 3, the light green weight 13 includes three equal sections divided by two shallow grooves 131, the red weight 12 includes two equal sections divided by one shallow groove 121. When the three-section light green weight 13 and the two-section red weight 12 are added together, they are equal to a five-section yellow weight 15. In FIG. 4, the three-section light green weight 13 is equal to a difference after subtracting the two-section red weight 12 from the five-section yellow weight 15. In FIG. 5, the six-section green weight 16 is equal to a product of multiplying the three-section light green weight 13 by the two-section red weight 12. And, in FIG. 6, the three-section light green weight 13 is equal to a result of dividing the six-section green weight 16 by the two-section red weight 12. Since the weights 10 to 19 have sections that could be very easily visually identified, they are helpful in guiding small children to learn about numbers and simple mathematical operations.

The weights 10 to 19 included in the teach-aiding weight set 1 of the present invention may be differently handled to provide various combinations. Although these combinations do not cover all conditions possibly occurred in all kinds of mathematic operations, they do include the basic operational concepts, principles, and theories, and are therefore very useful in teaching small children mathematics, particularly the concept about weight.

What is claimed is:

1. A teach-aiding weight set, comprising:

a white weight in the form of a cube and weighing 1 gram;

a red weight in the form of a rectangular parallelepiped, weighing 2 grams, and provided on four longitudinal outer surfaces with a continuously extended shallow groove to divide said red weight 12 into two equal sections;

a light green weight in the form of a rectangular parallelepiped, weighing 3 grams, and provided on four longitudinal outer surfaces with two continuously extended and equally spaced shallow grooves to divide said light green weight into three equal sections;

a purple weight in the form of a rectangular parallelepiped, weighing 4 grams, and provided on four longitudinal outer surfaces with three continuously extended and equally spaced shallow grooves to divide said purple weight into four equal sections;

a yellow weight in the form of a rectangular-parallelepiped, weighing 5 grams, and provided on four longitudinal outer surfaces with four continuously extended and equally spaced shallow grooves to divide said yellow weight into five equal sections;

a green weight in the form of a rectangular parallelepiped, weighing 6 grams, and provided on four longitudinal outer surfaces with five continuously extended and equally spaced shallow grooves to divide said green weight into six equal sections;

a black weight in the form of a rectangular parallelepiped, weighing 7 grams, and provided on four longitudinal outer surfaces with six continuously extended and equally spaced shallow grooves to divide said black weight into seven equal sections;

a brown weight in the form of a rectangular parallelepiped, weighing 8 grams, and provided on four longitudinal outer surfaces with seven continuously extended and equally spaced shallow grooves to divide said brown weight into eight equal sections;

a blue weight in the form of a rectangular parallelepiped, weighing 9 grams, and provided on four rectangular outer surfaces with eight continuously extended and equally spaced shallow grooves to divide said blue weight into nine equal sections; and an orange weight in the form of a rectangular parallelepiped, weighing 10 grams, and provided on four longitudinal outer surfaces with nine continuously extended and equally spaced shallow grooves to divide said orange weight into ten equal sections;

whereby when said weights are used in teaching small children mathematics, the specific color, weight, and shallow-groove-divided sections of each of said weights help small children to learn primary mathematical concepts, particularly the concept of weight.

* * * * *